United States Patent [19]
Taoda et al.

[11] Patent Number: 5,981,425
[45] Date of Patent: Nov. 9, 1999

[54] PHOTOCATALYST-CONTAINING COATING COMPOSITION

[75] Inventors: Hiroshi Taoda, Nagoya; Toru Nonami, Nagoya; Takaaki Fujiwa, Himeji; Masahiro Kagotani, Kakogawa, all of Japan

[73] Assignees: Agency of Industrial Science & Tech., Tokyo; Daicel Chemical Ind., Ltd., Osaka; H. Taoda; T. Nonami, both of Nagoya, all of Japan

[21] Appl. No.: 09/285,056

[22] Filed: Apr. 2, 1999

[30] Foreign Application Priority Data

Apr. 14, 1998 [JP] Japan .................................. 10-121868

[51] Int. Cl.$^6$ .......................... B01J 27/14; B01J 27/182; B01J 21/06
[52] U.S. Cl. .......................... 502/208; 502/159; 502/214; 502/232; 502/233; 502/237; 502/238; 502/239; 502/349; 502/350; 502/527.12; 502/527.13; 502/527.15
[58] Field of Search ...................... 502/159, 208, 502/214, 232, 233, 237, 238, 239, 349, 350, 527.12, 527.13, 527.15

[56] References Cited

U.S. PATENT DOCUMENTS 5,872,072  2/1999  Mouri et al. ............................. 502/208

*Primary Examiner*—Elizabeth D Wood
*Attorney, Agent, or Firm*—Nikaido, Marmelstein, Murray & Oram LLP

[57] ABSTRACT

A coating composition which is excellent in water resistance, weatherability and durability and can maintain its appearance for a prolonged period of time can be provided. A coating composition comprising a coating component and a photocatalyst containing calcium phosphate and titanium oxide is disclosed. As the photocatalyst, use is made of titanium oxide particles partially covered thereon with calcium phosphate, or porous body coated thereon with a film of titanium oxide, the film of titanium oxide being further covered partially thereon with calcium phosphate. The crystal form of titanium oxide is preferably anatase. The organic coating includes vinyl-type synthetic resin emulsions, and the inorganic coating is e.g. a solution containing a metal alkoxide for forming a film by a sol-gel method.

14 Claims, No Drawings

PHOTOCATALYST-CONTAINING COATING COMPOSITION

BACKGROUND OF THE INVENTION

1. Field of the Invention

The present invention relates to an organic or inorganic coating composition containing a photocatalyst partially covered thereon with calcium phosphate.

2. Description of the Prior Art

A coating though depending on its use yellows or deteriorates with time after application, due to the adhesion of oil in dirt from the hands, moisture in the air, oxidation, photodecomposition etc.

Accordingly, an anti-fungus agent is incorporated into a coating to improve the durability of its film and to maintain its appearance.

For example, JP 8-259891A (1996) discloses the art of incorporating a powder having photocatalytic functions into a silica coating. As the powder having photocatalytic functions, mention is made of titanium oxide, zirconium oxide, zinc oxide, strontium titanate, tin oxide, tungsten oxide, iron oxide and bismuth oxide, and it is described in the Examples therein that e.g. deodorization and antibacterial effects are achieved by incorporating titanium oxide into a film.

JP 5-305691A (1993) describes a hydrophilic film having a film containing silica and an inorganic material with an average particle diameter of 5 μm or less selected from titanium dioxide, chromium oxide and iron oxide, said film further containing at least silica thereon.

WO 96/29375 discloses a photocatalytic hydrophilic film comprising silica and a photocatalytic material selected from $TiO_2$, $ZnO$, $SnO_2$, $SrTiO_3$, $WO_3$, $Bi_2O_3$ and $Fe_2O_3$.

JP 10-237357A (1998) (published after the priority date of the present patent application) describes a photocatalytic hydrophilic coating composition consisting of a solution containing crystalline titanium oxide particles, tungsten chloride and tetrahydrofuran.

Further, as a material for forming a hydrophobic surface, JP 10-237431A (1998) (published after the priority date of the present patent application) describes a water-repellent material containing photocatalyst oxide particles such as titanium oxide etc., silicone and a water-repellent fluorine resin.

However, even if the photocatalyst described in these publications is contained in a film, there are also cases where effects such as deodorization and antibacterial effects are inadequate, and it is desired to develop a coating having higher durability and appearance-retention performance for a prolonged period of time.

In addition, if an organic coating is used as a coating component, the organic coating component comes into direct contact with $TiO_2$ etc., so there is also the problem of coating deterioration.

SUMMARY OF THE INVENTION

Accordingly, the object of the present invention is to provide a coating composition which is excellent in water resistance, weatherability and durability and capable of maintaining the appearance thereof for a long period of time, thus solving the above problems in the prior art.

As a result of their eager study, the present inventors found that as the photocatalyst, a photocatalyst containing calcium phosphate and titanium oxide, specifically titanium oxide partially covered thereon with calcium phosphate can be used to achieve the object described above, to arrive at the present invention.

That is, the present invention relates to a coating composition comprising a coating component and a photocatalyst containing calcium phosphate and titanium oxide.

In the present invention, said photocatalyst may be titanium oxide particles partially covered thereon with calcium phosphate. The titanium oxide particles may be porous.

In the present invention, said photocatalyst may also have inorganic particles coated thereon with a film of titanium oxide, said film of titanium oxide being further covered partially thereon with calcium phosphate. Said inorganic particles are preferably at least one porous body selected from activated carbon, activated alumina and silica gel. The film of titanium oxide preferably has pores of uniform size. The diameter of a pore in the film of titanium oxide is also preferably 1 nm to 2 μm.

In the present invention, it is preferable that 1 to 99% (area %) of the surface of titanium oxide is covered with calcium phosphate.

In the present invention, the crystal form of titanium oxide is preferably anatase.

In the present invention, calcium phosphate is selected preferably from the group consisting of apatite, tricalcium phosphate and octacalcium phosphate.

In the present invention, the coating component may use any organic or inorganic coating known in the art.

The coating composition of the invention is constituted as described above, so the coating made of this coating composition rarely undergoes yellowing or deterioration even after adhesion of oil or water, thus achieving superior durability and maintaining the appearance thereof.

The coating composition of the invention can be used preferably in various applications to e.g. the exterior and interior of a building.

DETAILED DESCRIPTION OF THE INVENTION

First, the photocatalyst used in the present invention is described. In the present invention, a photocatalyst containing calcium phosphate and titanium oxide is used. Although the form of this photocatalyst is not particularly limited, but taking it into consideration that calcium phosphate is excellent in the ability to absorb proteins and a wide variety of aqueous dirt components and also that titanium oxide is superior in photocatalytic functions, the form of the photocatalyst having covering of calcium phosphate on a part of the surface of titanium oxide is preferable.

The form of the photocatalyst includes, but is not limited to, titanium oxide particles as a first form partially covered thereon with calcium phosphate and inorganic particles as a second form coated thereon with a film of titanium oxide which is further covered partially thereon with calcium phosphate.

The first and second forms are common in that titanium oxide having photocatalytic functions is partially covered thereon with calcium phosphate, and these forms have substantially the same function.

The titanium oxide particles in the first photocatalyst may make use of conventional titanium oxide particles (with an average diameter of e.g. 1 μm to a few mm). Alternatively, porous titanium oxide particles are also preferably used, and in this case the surface area of particles is large to attain higher photocatalytic performance.

Further, in the present invention, the crystal form of titanium oxide is preferably anatase to achieve higher photolocatalytic performance.

In the second photocatalyst, the inorganic particles are coated thereon with a film of titanium oxide. The inorganic particles include various materials such as porous ceramics, glass and metal, but in consideration of the size of specific surface area and manufacturing costs, a porous body selected from activated carbon, activated alumina and silica gel is particularly preferable.

This film of titanium oxide is preferably that having pores of uniform size. Owing to the presence of pores of uniform size, the specific surface area is increased and higher photocatalytic performance can be obtained. That is, the pores permit efficient absorption of water or organic components present in a coating film or on the surface of a coating film, and these can be rapidly decomposed by the oxidation-reduction of electrons and positive holes formed upon irradiation.

The diameter of a pore in the film of titanium oxide is not particularly limited, but is preferably 1 nm to 2 $\mu$m from the viewpoint of efficient absorption of water and organic components.

Further, in the present invention, the crystal form of titanium oxide is preferably anatase to achieve high photocatalytic performance.

Formation of a film of titanium oxide on the surface of inorganic particles such as porous body etc. can be effected by coating the inorganic particles with a titania sol followed by heating and calcination thereof. Polyethylene glycol and/or polyethylene oxide is preferably added to the titania sol.

The titania sol can be prepared by suspending superfine particles of titanium oxide in water or by hydrolyzing a titanium alkoxide obtained by reacting an alcohol with titanium tetrachloride or metal titanium. In this case, a uniform and transparent titania sol is obtained by adding alcohol amines such as monoethanolamine, diethanolamine, triethanolamine, N-methyldiethanolamine, N-ethyldiethanolamine, N,N-dimethyldiaminoethanol and di-isopropanolamine, or glycols such as diethylene glycol, and this titania sol can be used to prepare a high-performance porous photocatalyst.

A porous body is coated thereon with the resulting titania sol by dip coating, dropping, coating or spraying, followed by heating and calcination thereof.

Polyethylene glycol and/or polyethylene oxide is preferably added to the titania sol so that a photocatalyst with a specific surface area having pores formed therein is preferably obtained. That is, if polyethylene glycol and/or polyethylene oxide is added to the titania sol, these burn and disappear in the step of heating and calcination to provide the surface of the porous body with pores communicating with the pores therein so that a photocatalyst with a large specific surface area is obtained.

The calcination is conducted preferably by gradually heating the porous body at room temperature to a temperature of a final temperature of 600° C. to 700° C. or by heating it at a temperature of 400° C. to 600° C. By this procedure, the titania sol with which the porous body has been covered is converted into titanium oxide as a high-performance photocatalyst whose crystal form is anatase. In this step, if the porous body is calcinated by heating at a temperature of 600° C. to 700° C. directly or at a calcination temperature of less than 400° C. or more than 700° C., there is brought about low-active rutile as a photocatalyst or partially amorphous titanium oxide.

In a preferable example for preparing the high-performance photocatalyst having a film of titanium oxide adhering strongly to a porous body in the present invention, a titania sol to which polyethylene glycol and/or polyethylene oxide was added is applied, sprayed or coated thinly onto the porous body followed by heating and calcination thereof to form a film of titanium oxide on the porous body, and this operation is repeatedly conducted whereby a multi-layer film of titanium oxide is formed on the surface of the porous body.

Alternatively, in the case where the porous body is e.g. activated carbon, it is preferable to use a porous body whose surface has been rendered hydrophilic by treatment with an acid such as nitric acid, sulfuric acid or hydrochloric acid. By doing so, the film of titanium oxide is bonded tightly to the surface of the porous body thereby giving a high-performance porous photocatalyst which is strong and excellent in durability.

In the present invention, polyethylene glycol and/or polyethylene oxide added to the titania sol preferably are preferably those having molecular weights of 1000 or more, particularly preferably those having molecular weights of 1000, 1500, 2000, 3000, 6000, 8000, 11,000, 13,000, 20,000, 100,000, 300,000, 2,000,000, and 2,500,000. By use of those with molecular weights of 1000 or more, the film of titanium oxide formed on the surface of the porous body will not be removed from the porous body so that the high-performance porous photocatalyst which is strong and excellent in durability can be obtained.

In the present invention, polyethylene glycol and/or polyethylene oxide added to the titania sol is preferably in an amount below the solubility thereof. If it is added over the solubility thereof, it is hard to form fine pores of uniform size and it is hard to form a film of titanium oxide which is strong and excellent in durability.

In the present invention, the diameter of a pore in the film of titanium oxide and the density of pore distribution can be regulated by changing the amount or molecular weight of polyethylene glycol and/or polyethylene oxide to be added. If polyethylene glycol and/or polyethylene oxide added are added in a small amount or those with low molecular weights are used, the resulting pores have a small diameter, while if they are added in a large amount or those with large molecular weights are used, the resulting pores have a large diameter. And if they are added in a small amount, the density of pore distribution becomes low, while if their amount is large, the density of pore distribution becomes high. Further, if polyethylene glycol and/or polyethylene oxide with a broad distribution of molecular weights is added, the resulting pores have a broad range of diameters. By further laminating a film of titanium oxide thereon., the porous body comes to have a specific three-dimensional structure. In the manner described above, a film of titanium oxide can be formed on the surface of the porous body.

The photocatalyst used in the present invention comprises this film of titanium oxide further provided partially thereon with covering of calcium phosphate. Alternatively, it comprises the titanium oxide particles partially provided thereon with covering of calcium phosphate.

In the present invention, calcium phosphate is not particularly limited and is selected preferably from the group consisting of apatite, tricalcium phosphate and octacalcium phosphate. The apatite includes e.g. hydroxy apatite, fluorinated apatite, apatite carbonate, silver apatite etc.

Calcium phosphate such as in apatite absorbs proteins such as microorganisms etc. or aqueous dirt (sweat, finger marks, aqueous ink etc.). Titanium oxide is inferior in such absorption ability to calcium phosphate. Accordingly, by further providing titanium oxide partially thereon with covering of calcium phosphate, proteins and a wide variety of other dirt components are absorbed into the calcium phosphate and decomposed by the photocatalytic oxidation-reduction of the titanium oxide.

For such actions of calcium phosphate and titanium oxide, it is generally preferable that 1 to 99% (area %) of the surface of titanium oxide is covered with calcium phosphate. That is, if this coverage degree is less than 1%, the effect of absorption by calcium phosphate is hardly obtained, while if the coverage degree exceeds 99%, the photocatalytic effect of titanium oxide is hardly obtained because the surface of titanium oxide is too much covered. The coverage degree is preferably 2 to 80%, more preferably 5 to 70% or so.

The form of calcium phosphate covering is not particularly limited and a wide variety of forms can be used. For example, calcium phosphate may be in the form of a layer, fine leaves, or fine granules. That is, it is possible to use any of the forms where titanium oxide is partially covered thereon with calcium phosphate in the form of a layer, and where titanium oxide is partially covered thereon with calcium phosphate in the form of fine leaves or fine granules.

The most preferable form is that the surface of titanium oxide is uniformly partially covered with calcium phosphate in the form of fine granules, and in this case, its coverage degree may be 20% or less, for example about 2 to 10%.

Covering with calcium phosphate may be conducted by immersing titanium oxide particles or particles coated with titanium oxide in an aqueous solution containing at least Ca and P, followed by drying them. The aqueous solution may be a pseudo-humor. The pseudo-humor preferably contains ions such as, for example, Na, K, Cl, Ca, P, and Mg, etc. In particular, it is preferably at pH 7 to 8, more preferably at pH 7.3 to 7.7. Immersion in the aqueous solution is conducted for example at 20 to 60° C. for 10 minutes to 30 days or so, preferably at 30 to 40° C. for 20 minutes to 24 hours or so.

Although the thickness of the covering of calcium phosphate is not particularly limited, it is preferably 1 nm to 3 μm, more preferably 1 nm to 2 μm from the viewpoint of photocatalytic performance and manufacturing costs.

Now, the coating component used in the present invention is described. In the present invention, it is possible to use any aqueous or solvent-type organic coatings or inorganic coatings known in the art.

For example, the aqueous organic coating includes vinyl-type synthetic resin emulsions. The vinyl-type synthetic resin is not particularly limited and includes any polymers from vinyl-type monomers capable of emulsion polymerization, and examples are acrylic resin, acrylic copolymer resin, styrene copolymer resin, vinyl acetate resin, vinyl acetate copolymer resin, and ethylene-vinyl acetate copolymer resin. Out of various resins, a resin particularly soluble in solvent can be used as a solvent-type organic coating.

Polymerizable monomer components for these resins include e.g. (meth)acrylates, amide linkage-containing vinyl monomers, styrene or styrene derivatives, (meth) acrylonitrile, carboxyl group-containing vinyl monomers, hydroxyl group-containing vinyl monomers, vinyl halides, vinyl esters, silyl group-containing vinyl monomers etc.

Specifically, the (meth)acrylates include (meth)acrylates having an alkyl group containing 1 to 12 carbons, preferably 1 to 8 carbons. More specifically, mention can be made of methyl (meth)acrylate, ethyl (meth)acrylate, propyl (meth) acrylate, n-butyl (meth)acrylate, isobutyl (meth)acrylate, t-butyl (meth)acrylate, pentyl (meth)acrylate, hexyl (meth) acrylate, 2-ethylhexyl (meth)acrylate, octyl (meth)acrylate, iso-octyl (meth)acrylate, cyclohexyl (meth)acrylate etc. Among these, methyl (meth)acrylate, n-butyl (meth) acrylate, 2-ethylhexyl (meth)acrylate, cyclohexyl (meth) acrylate etc. are preferable because these are readily available and excellent in copolymerizability with other vinyl type monomers.

Further, the amide linkage-containing vinyl monomers include e.g. acrylamide, methacrylamide, α-ethylacrylamide; N-substituted (meth)acrylamides such as N,N-dimethylacrylamide, N, N-dimethylmethacrylamide, N-methylacrylamide, N-methylmethacrylamide, N-methylolacrylamide, N-methylolmethacrylamide; N-substituted (meth)acrylamide dimers such as methylene-bis-acrylamide, methylene-bis-methacrylamide; N-vinylpyrrolidene etc. Among these, acrylamide, methacrylamide, α-ethylacrylamide, N,N-dimethylacrylamide, N,N-dimethylmethacrylamide etc. are preferable because these are readily available and excellent in copolymerizability with other vinyl type monomers.

The styrene or styrene derivatives include styrene, α-methyl styrene, p-tert-butyl styrene, vinyl toluene, monochlorostyrene etc. Among these, styrene, α-methyl styrene etc. are preferable because these are readily available and excellent in copolymerizability with other vinyl type monomers.

The carboxyl group-containing vinyl monomers include e.g. (meth)acrylic acid, maleic acid, half esters of maleic acid, fumaric acid, half esters of fumaric acid, itaconic acid, half esters of itaconic acid, crotonic acid, α, β-unsaturated carboxylic acids such as cinnamic acid etc.; and further carboxyalkyl (meth)acrylates such as carboxyethyl (meth) acrylate and carboxypropyl (meth)acrylate; and esters between dicarboxylic acids and monohydroxyalkyl acrylates, such as phthalic acid monohydroxyethyl acrylate and succinic acid monohydroxyethyl acrylate. Among these, acrylic acid, methacrylic acid etc. are preferable because these are readily available and excellent in copolymerizability with other vinyl type monomers.

The hydroxy group-containing vinyl monomers include e.g. hydroxyethyl (meth)acrylate, hydroxypropyl (meth) acrylate etc.

The vinyl halides include vinyl chloride, vinylidene chloride etc. The vinyl esters include vinyl acetate, vinyl propionate etc.

The silyl group-containing vinyl monomers include e.g. divinyldimethoxysilane, divinyldi-β-methoxyethoxysilane, vinyltriethoxysilane, vinyl-tris-β-methoxyethoxysilane, γ-(meth)acryloxypropyltrimethoxysilane, γ- (meth) acryloxypropyltriethoxysilane, γ-(meth) acryloxypropylmethyldiethoxysilane etc. Among these, γ-(meth)acryloxypropyltrimethoxysilane, γ-(meth) acryloxypropyltriethoxysilane etc. are preferable because these are readily available and their alkoxysilane group is stable.

A plurality of monomers are as necessary selected arbitrarily from a wide variety of these polymerization monomers.

As the polymerization monomers, butadiene, divinyl benzene, diallyl phthalate etc. can be used as necessary in addition to those enumerated above.

In the present invention, the vinyl type polymer can be obtained in any method known in the art. That is, it can be obtained in a usual manner by emulsion polymerization of the various polymerization monomers described above in the presence of an emulsifier.

In the present invention, the weight average molecular weight of the vinyl type polymer is not particularly limited and is in the range of 50,000 to 1,000,000, preferably 200,000 to 800,000 as determined using polystyrene as standards.

As the inorganic coating used in the present invention, mention is made of a solution containing a hydrolysis-polymerizable metal alkoxide for forming a film by a sol-gel method.

The metal in the metal alkoxide includes, but is not limited to, for example, Al, Ti, Zr and Si etc. Among these metals, Al and Si are preferable, and Si is particularly preferable.

The alkoxide group in the metal alkoxide includes, but is not limited to, alkoxy groups such as methoxy, ethoxy, propoxy, isopropoxy, butoxy, isobutoxy, sec-butoxy, pentyloxy, and hexyloxy. Among these, C1 to C4 lower alkoxy groups are preferable, among which methoxy, ethoxy, propoxy etc. are particularly preferable. The metal alkoxide contains at least 2 alkoxide groups for hydrolysis polymerization.

The aluminum alkoxide compound includes e.g. trimethoxy aluminum, triethoxy aluminum, tripropoxy aluminum etc.

The titanium alkoxide compound includes e.g. trimethoxy titanium, tetramethoxytitanium, triethoxyltitanium, tetraethoxytitanium, tetrapropoxytitanium, chlorotrimethoxytitanium, chlorotriethoxytitanium, ethyltrimethoxytitanium, methyltriethoxytitanium, ethyltriethoxytitanium, diethyldiethoxytitanium, phenyltrimethoxytitanium, phenyltriethoxytitanium etc. The zirconium alkoxicle compound includes zirconates correspondingly to the above titanates.

The silicon alkoxide compound can be used preferably in the present invention. This silicon alkoxide compound is represented by the following formula (1):

$$(R_{11})_n Si(OR_{12})_{4-n} \qquad (1)$$

In this formula, $R_{11}$, represents an optionally substituted lower alkyl group or an optionally substituted aryl group, $R_{12}$ represents a lower alkyl group, $R_{11}$ and $R_{12}$ may be different depending on n. n is an integer of 0 or 1. The lower alkyl group represented by $R_{11}$ and $R_{12}$ is usually an alkyl group containing about 1 to 4 carbons, and includes methyl, ethyl, propyl, isopropyl, butyl, isobutyl and sec-butyl groups.

Examples of such silicon compounds include trimethoxysilane, triethoxysilane, tripropoxysilane, tetramethoxysilane, tetraethoxysilane, tetrapropoxysilane, methyltrimethoxysilane, ethyltrimethoxysilane, propyltrimethoxysilane, methyltriethoxysilane, ethyltriethoxysilane, propyltriethoxysilane, γ-chloropropyltrimethoxysilane, γ-chloropropyltrietkoxysilane, γ-mercaptopropyltrimethoxysilane, γ-mercaptopropyltriethoxysilane, γ-aminopropyltrimethoxysilane, γ-aminopropyltriethoxysilane, phenyltrimethoxysilane, phenyltriethoxysilane, phenyltripropoxysilane etc.

Among these silicon compounds, preferable examples include tetramethoxysilane, tetraethoxysilane, methyltrimethoxysilane, ethyltrimethoxysilane, methyltriethoxysilane, ethyltriethoxysilane, phenyltrimethoxysilane, phenyltriethoxysilane etc.

In the present invention, silicon compounds of formula (1) wherein n=2 can be used, as necessary, in addition to the above silicon compounds in order to adjust the hardness, flexibility etc. of the film after gelation. Such compounds include e.g. dimethyldimethoxysilane, dimethyldiethoxysilane, diphenyldimethoxysilane, diphenyldiethoxysilane etc.

These metal alkoxide compounds may be those partially polymerized. Further, the metal alkoxide compounds may be used alone or in combination thereof.

The above-described metal alkoxide compound preferably silicon alkoxide compound or colloidal silica is diluted in solvent, and after water or an acid or alkali catalyst is added thereto as a hardener, is subjected to a hydrolysis polymerization reaction to prepare an inorganic coating.

For preparation of such inorganic coatings, it is possible to use a suitable organic solvent besides water. Examples of such organic solvents include alcohols such as methanol, ethanol, propanol, isopropanol and butanol; ethers such as diethyl ether, dioxane, dimethoxyethane and tetrahydrofurane; and N-methylpyrrolidone, acetonitrile, dimethylformamide, dimethylacetamide, dimethyl sulfoxide, acetone, benzene etc. Alternatively, mixed solvents thereof can be used.

In the coating composition of the invention, the photocatalyst covered partially with calcium phosphate is contained at a mixing ratio of generally 1 to 50% by weight, preferably 5 to 30% by weight in terms of ratio by solid content, relative to the organic or inorganic coating. A mixing ratio of less than 1% by weight results in a lower photocatalytic effect, whereas a mixing ratio of more than 50% by weight leads to higher costs. The mixing ratio varies depending on the type of coating, but can be suitably determined by those skilled in the art in consideration of the photocatalytic effect and costs.

The coating composition of the invention is obtained by mixing a calcium phosphate- and titanium oxide-containing photocatalyst with an organic or inorganic coating. In this mixing, a film-forming auxiliary such as methyl cellosolve, carbitol, triethylene glycol, texanol etc. may be used. Further, the coating composition can, as necessary, incorporate known additives such as anti-foaming agent, a thickening agent, a lyophilization stabilizer, a wetting agent, a pigment, a water-soluble resin and a penetrant.

Application of the coating composition onto a material to be coated can be effected by conventional means such as brush, roller, air spray, airless spray etc.

The coating composition according to the present invention comprises a calcium phosphate- and titanium oxide-containing photocatalyst with higher photocatalytic functions than conventional photocatalysts, and preferably comprises a photocatalyst having titanium oxide covered partially thereon with calcium phosphate, and therefore, the resulting coating rarely undergoes yellowing or deterioration even after adhesion of oil or water, thus achieving excellent durability and maintaining its appearance.

If an organic solvent is used as a coating component, the organic coating component hardly comes into direct contact with $TiO_2$, thus making the coating stable.

EXAMPLES

Hereinafter, the present invention is described in more detail by reference to the Examples, which however are not intended to limit the present invention. Hereinafter, the term "parts" refers to parts by weight unless otherwise specified.

Reference Example 1

Preparative Example of Vinyl Type Synthetic Resin Emulsion

TABLE 1

| Preparative Example of Vinyl Type Synthetic Resin Emulsion | |
|---|---|
| Deionized water | 100.6 parts |
| 2-Ethylhexylacrylate | 33 parts |
| Methyl methacrylate | 24.5 parts |
| Styrene | 40 parts |
| Acrylic acid | 2 parts |
| Itaconic acid | 0.5 parts |
| γ-Methacryloyloxypropyltrimethoxysilane (Emulsifier) | 0.2 parts |
| Polyoxyalkylene styrene phenyl ether (n = 10) | 0.5 parts |
| Polyoxyalkylene styrene phenyl ether (n = 50) | 3.5 parts |
| Sulfate soda of polyoxyethylene nonyl phenyl ether (n = 6) | 0.5 parts |
| Sodium styrenesulfonate (Polymerization initiator) | 0.2 parts |
| Ammonium persulfate | 0.5 parts |
| Sodium bisulfite | 0.5 parts |

A synthetic resin emulsion was prepared using the formulation shown in Table 1 above.

40 parts of deionized water were introduced into a four-necked flask and heated to 80° C. in a nitrogen stream, and the polymerization initiator was added thereto. Separately, the polymerizable monomer was emulsified in an aqueous solution of the emulsifier dissolved in the remainder of water, and this emulsion was dropped for 3 hours into it the flask. The reaction temperature at the time of dropping was regulated within 78 to 82° C.

After dropping was finished, the reaction was continued under stirring while kept at the same temperature range for 2 hours, and the reaction solution was then cooled and adjusted to pH 8–9 with 14% ammonia water whereby a stable synthetic resin emulsion having a solid content of 50.4%, a particle diameter of 174 nm and a surface tension of 48 dyne/cm was prepared.

Reference Example 2

Preparation of a Photocatalyst Covered Partially with Calcium Phosphate 45 g of titanium tetraisopropoxide was diluted with 400 ml absolute ethanol, and 15 g of triethanolamine and 4 g of water were added thereto under stirring. Further, 4 g of polyethylene glycol with a molecular weight of 1500 was added thereto under stirring to prepare a transparent sol solution. Spherical silica gel with a diameter of about 10 μm was then coated with said sol solution by dropping. That is, a small amount of this sol solution was dropped onto the surface of the spherical silica gel, and an excess of the solution was removed, and the gel was dried and then heated gradually from room temperature to a temperature 600° C. for calcination. This was repeated 5 times so that a film of titanium oxide was formed on the surface of the spherical silica gel. As a result of examination of the crystal structure of the resulting film of titanium oxide by X-ray diffraction, the structure was composed of 100% anatase. Observation of the surface under an electron microscope indicated that it had pores with a size of about 20 nm.

The resulting particles coated with the film of titanium oxide was suspended in 1 L pseudo-humor, left for 2 hours at 37° C. and then dried at 100° C. The pseudo-humor contained 8000 mg sodium chloride, 200 mg potassium chloride, 1150 mg sodium monohydrogen phosphate, 200 mg potassium dihydrogen phosphate and 200 mg calcium chloride per litter of water. In this manner, a photocatalyst having a part (about 12% under an electron microscope) of the surface of the film of titanium oxide covered with calcium phosphate was obtained.

Reference Example 3

Preparation of a Photocatalyst Partially Covered with Calcium Phosphate 10 g of anatase-type titanium oxide (Super Titania, an average particle diameter of 30 nm, Showa Denko, K. K.) was suspended in 1 L of the same pseudo-humor as in Reference Example 2, left for 2 hours at 37° C. and then dried at 100° C. In this manner, a photocatalyst having a part (about 2% under an electron microscope) of the surface of the titanium oxide particles covered with calcium phosphate was obtained.

Examples 1 to 2, Comparative Examples 1 to 2

The synthetic resin emulsion obtained in Reference Example 1 was formed into a coating with the formulation shown in Table 2. That is, as the photocatalyst, $TiO_2$ covered with calcium phosphate obtained in Reference Example 2 was used in Example 1, $TiO_2$ covered with calcium phosphate obtained in Reference Example 3 was used in Example 2, $TiO_2$ R630 (average particle diameter of 0.24 μm, produced by Ishihara Sangyo Kaisha, Ltd.) was used in Reference Example 1, and anatase-type $TiO_2$ ST41 (average particle diameter of 0.1 μm, produced by Ishihara Sangyo Kaisha, Ltd.) was used in Reference Example 2.

Each of these coatings was evaluated for coating performance.

Each coating was applied by a bar coater # 420 onto an aluminum plate and burned at 120° C. for 30 minutes to prepare a test piece. (Weatherability)

Each test piece was placed in a QUV promoted-weatherability tester and subjected to a promotion test for 3000 hours, and the degree of gloss retention (%) was quantified with a gloss meter.

(Stain Resistance)

Using a black aqueous ink, a line of 2 mm in width was drawn on the coating film on each test piece. A promotion test was conducted under the conditions of QUV 3000 hours, 60° C. and humidity of 20%, and the degree of decomposition of the black ink (%) was determined using a Macbeth densitometer. That is, higher degrees of decomposition of the ink (%) indicate higher stain resistance.

Degree of decomposition of ink (%) 100×[(density of the black ink before the promotion test)−(density of the black ink after the promotion test)]/(density of the black ink before the promotion test)

The results are shown collectively shown in Table 2.

TABLE 2

| Coating ingredients | Comparative Example 1 | Comparative Example 2 | Example 1 | Example 2 |
|---|---|---|---|---|
| Water | 7.8 parts | 7.8 parts | 7.8 parts | 7.8 parts |
| HEC SP600 (Dicel Chemical Industries, Ltd.) | 0.27 parts | 0.27 parts | 0.27 parts | 0.27 parts |
| Primal 850 (Rhoom & Haas) | 0.65 parts | 0.65 parts | 0.65 parts | 0.65 parts |
| SN defoamer 315 (Sunnopco) | 0.40 parts | 0.40 parts | 0.40 parts | 0.40 parts |
| $TiO_2$ R630 (Ishihara Sangyo Kaisha, Ltd.) | 31.4 parts | — | — | — |
| Anatase-type $TiO_2$ ST41 (Ishihara Sangyo Kaisha, Ltd.) | — | 31.4 parts | — | — |
| Calcium phosphate-covered $TiO_2$ (Reference Example 2) | — | — | 31.4 parts | — |
| Calcium phosphate-covered $TiO_2$ (Reference Example 3) | — | — | — | 31.4 parts |
| Synthetic resin emulsion (Reference Example 1) | 100 parts | 100 parts | 100 parts | 100 parts |
| CS 12 (Chisso Corporation) | 4.0 parts | 4.0 parts | 4.0 parts | 4.0 parts |
| Weatherability: Degree of gloss retention (%) | 80 | 50 (Film deterioration) | 80 | 80 |
| Stain resistance: Degree of decomposition of ink (%) | 10 | 35 | 50 | 50 |

As can be seen from Table 2, because $TiO_2$ was covered partially with calcium phosphate in Examples 1 and 2, the coating component in the coating did not come in direct contact with $TiO_2$, so the coating was stable and superior in weatherability to that of Comparative Example 2 where usual anatase-type $TiO_2$ was used. Further, in Examples 1 and 2, the aqueous ink was absorbed into calcium phosphate and the decomposition of the ink was promoted, so the coating was also superior in stain resistance.

Example 3

100 parts of methyltrimethoxysilane, 10 parts of tetraethoxysilane, 90 parts of organosilica gel, 30 parts of dimethyldimethoxysilane and 100 parts of isopropyl alcohol were mixed, and then 90 parts of water and 40 parts of the $TiO_2$ covered partially with calcium phosphate in Reference Example 2 were added thereto and stirred. Thereafter, this suspension was regulated in a thermostatic bath at 60° C. such that its weight average molecular weight became 1500, to give a photocatalyst-containing inorganic coating.

This coating was applied by a bar coater #20 onto an alumina substrate, and the resulting film was further immersed in 1 weight-% aqueous sodium hydroxide for 24 hours to prepare the inorganic coating film.

Comparative Example 3

An inorganic coating film was prepared in the same manner as in Example 2 except that as the photocatalyst, $TiO_2$ (Nippon Aerosol K: P-25) was used in place of the $TiO_2$ covered partially with calcium phosphate in Reference Example 2.

To evaluate the photocatalytic action of the inorganic coating film, the degree of removal of aldehyde (%), the degree of decomposition of the black aqueous ink (%) and the degree of gloss retention (%) were measured.
(Degree of removal of aldehyde)

An alumina substrate on which the inorganic coating film had been formed was placed in a plastic vessel, then 50 ppm acetaldehyde was injected in this vessel, it was irradiated with 10 W black light for 30 minutes, and the degree of removal of acetaldehyde was determined by gas chromatography.

The measurement of the degree of decomposition of the aqueous ink (%) and the degree of gloss retention (%) was conducted in the same manner as in Example 1. The results thus obtained are collectively shown in Table 3.

TABLE 3

| | Degree of removal of aldehyde (%) | Degree of decomposition of ink (%) | Degree of gloss retention (%) |
|---|---|---|---|
| Example 3 | 68 | 50 | 90 |
| Comparative Example 3 | 67 | 30 | 90 |

According to Table 3, the coating film in Example 3 was superior to that of Comparative Example 2 in respect of the degree of removal of aldehyde and the degree of decomposition of the aqueous ink.

Example 4

Ares silicon (Kansai Paint Co., Ltd.) was used as a solvent-type, two-pack crosslinked acrylic silicon resin. The $TiO_2$ covered with calcium phosphate obtained in Reference Example 3 was dispersed in the clear base of said Ares silicon such that its content was 10% by weight in the total resin. An Ares silicon hardener was added at the ratio of 1 part of said hardener to 14 parts of said clear base, and the mixture was applied in a thickness of 20 $\mu$m onto an aluminum plate and hardened at room temperature for 1 week whereby a test piece was prepared.

Comparative Example 4

A test piece was prepared in the same manner as in Example 4 except that as the photocatalyst, anatase-type $TiO_2$ STL41 (Ishihara Sangyo Kaisha, Ltd.: average particle diameter of 0.1 $\mu$m) was used in place of the $TiO_2$ covered partially with calcium phosphate in Reference Example 3.

Each of the test pieces in Example 4 and Reference Example 4 was examined for the degree of gloss retention (%) as weatherability and for the degree of decomposition of ink (%) as stain resistance in the same manner as in Example 1. The results are shown in Table 4.

TABLE 4

|  | Weatherability: Degree of gloss retention (%) | Stain resistance: Degree of decomposition of ink (%) |
|---|---|---|
| Example 4 | 90 | 52 |
| Comparative Example 4 | 50 (Film deterioration) | 50 |

As can be seen from Table 4, because the $TiO_2$ covered with calcium phosphate was used as the photocatalyst in Example 4, its film was stable and superior in weatherability to that of Comparative Example 4 where the conventional anatase-type $TiO_2$ was used. Further, in Example 4, the decomposition of the ink was also promoted, and the film was also superior in stain resistance.

The present invention can be carried out in any other embodiments without departure to the sprit and major characteristics of the present invention. Accordingly, the foregoing examples are described merely for illustrative purposes and should not be construed restrictively. Further, any alternation belonging to an equivalent of the claims is within the scope of the invention.

What is claimed is:

1. A coating composition comprising a coating component and a photocatalyst containing calcium phosphate and titanium oxide.

2. The coating composition according to claim 1, wherein said photocatalyst is titanium oxide particles partially covered thereon with calcium phosphate.

3. The coating composition according to claim 2, wherein the titanium oxide particles are porous.

4. The coating composition according to claim 1, wherein said photocatalyst comprises inorganic particles coated thereon with a film of titanium oxide, the film of titanium oxide being further covered partially thereon with calcium phosphate.

5. The coating composition according to claim 4, wherein said inorganic particles are at least one porous body selected from the group consisting of activated carbon, activated alumina and silica gel.

6. The coating composition according to claim 4, wherein the film of titanium oxide has pores of uniform diameter.

7. The coating composition according to claim 6, wherein a pore in the film of titanium oxide has a diameter of 1 nm to 2 μm.

8. The coating composition according to claim 1, wherein 1 to 99% of the surface of titanium oxide is covered with calcium phosphate.

9. The coating composition according to claim 1, wherein the crystal form of titanium oxide is anatase.

10. The coating composition according to claim 1, wherein calcium phosphate is selected from the group consisting of apatite, tricalcium phosphate and octacalcium phosphate.

11. The coating composition according to claim 1, wherein the coating component is organic.

12. The coating composition according to claim 11, wherein the organic coating is a vinyl type synthetic resin emulsion.

13. The coating composition according to claim 1, wherein the coating component is inorganic.

14. The coating composition according to claim 11, wherein the inorganic coating is a solution containing a metal alkoxide for forming a film by a sol-gel method.

* * * * *